United States Patent [19]

Mastro

[11] Patent Number: 4,462,477
[45] Date of Patent: Jul. 31, 1984

[54] TRACTOR BOGIE SUSPENSION WITH STEERING AND WEIGHT TRANSFER CONTROL

[75] Inventor: James R. Mastro, Lemont, Ill.

[73] Assignee: International Harvester Co., Chicago, Ill.

[21] Appl. No.: 441,970

[22] Filed: Nov. 15, 1982

[51] Int. Cl.³ ............................................. B60G 25/00
[52] U.S. Cl. .................................... 180/24.02; 172/7; 180/23; 280/405 R; 280/682; 280/704
[58] Field of Search ............... 180/24.02, 24.05, 24.06, 180/21, 22, 23, 41, 135, 251, 254, 209; 172/1, 7; 280/405 R, 423 R, 682, 704, 143, 109, 111, 113, 98, 99, 100; 267/64.15; 188/295; 37/124, DIG. 12

[56] References Cited

U.S. PATENT DOCUMENTS 2,936,039 5/1960 Rockwell ............................ 180/135
4,056,158 11/1977 Ross ............................ 180/24.02 X

FOREIGN PATENT DOCUMENTS 2407970 9/1974 Fed. Rep. of Germany ...... 280/704
802865 10/1958 United Kingdom ............. 180/24.02

OTHER PUBLICATIONS

Agricultural Machinery Journal, 4-76, p. 41.
Implement and Tractor, 6-7-76.
Design News, 1-12-76, p. 33.
Popular Science, 3-77, p. 83.
Power Farming, 1-78, p. 47.

Primary Examiner—Joseph F. Peters, Jr.
Assistant Examiner—Mitchell J. Hill
Attorney, Agent, or Firm—Boris Parad; F. David AuBuchon

[57] ABSTRACT

Tractor bogie suspension with steering and weight transfer control, effective to pitch such a front-steered machine as to convert from a non-all-wheel drive, three axle operation to an all-wheel-drive, two axle operation, doing so both automatically and on the go.

10 Claims, 10 Drawing Figures

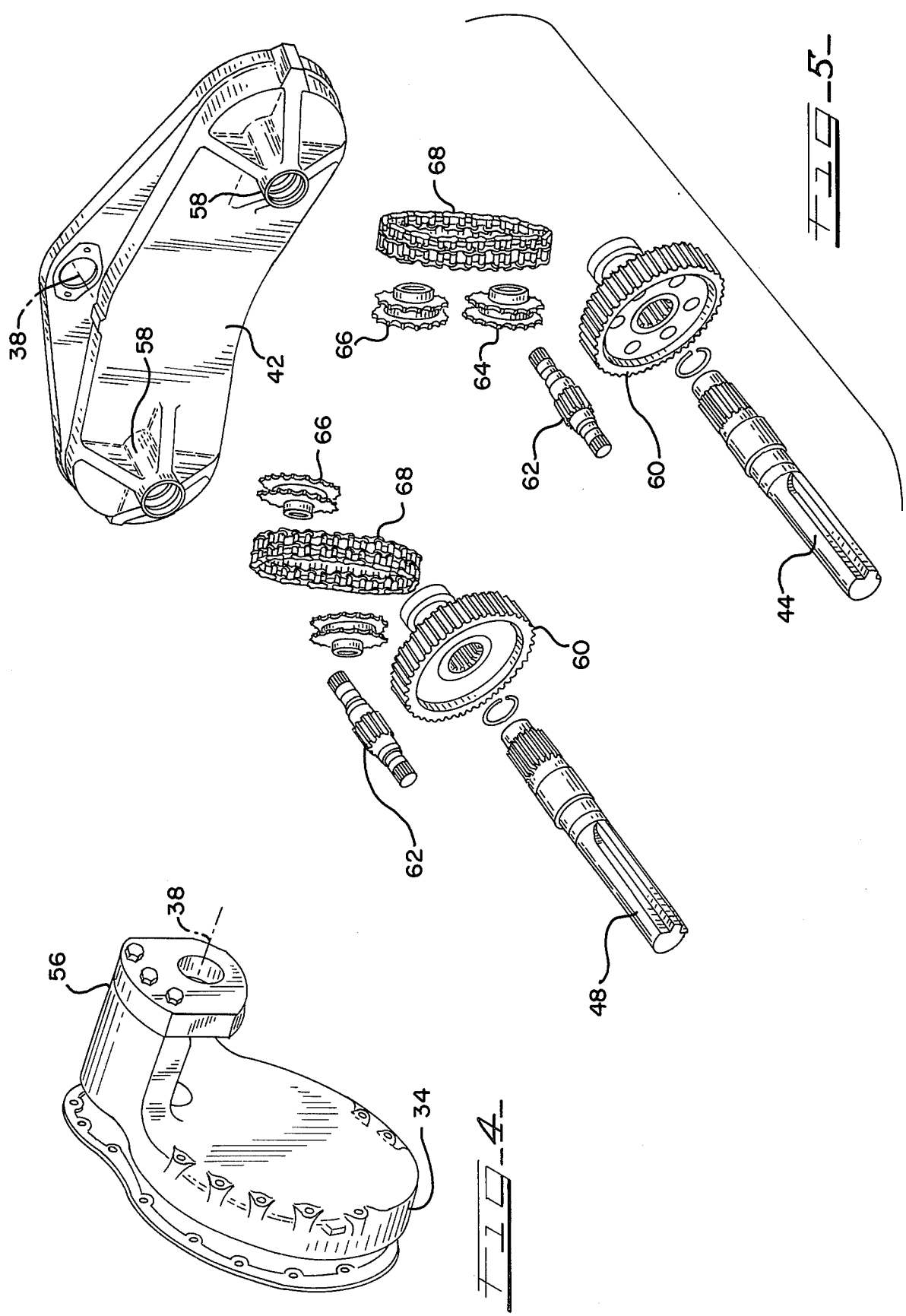

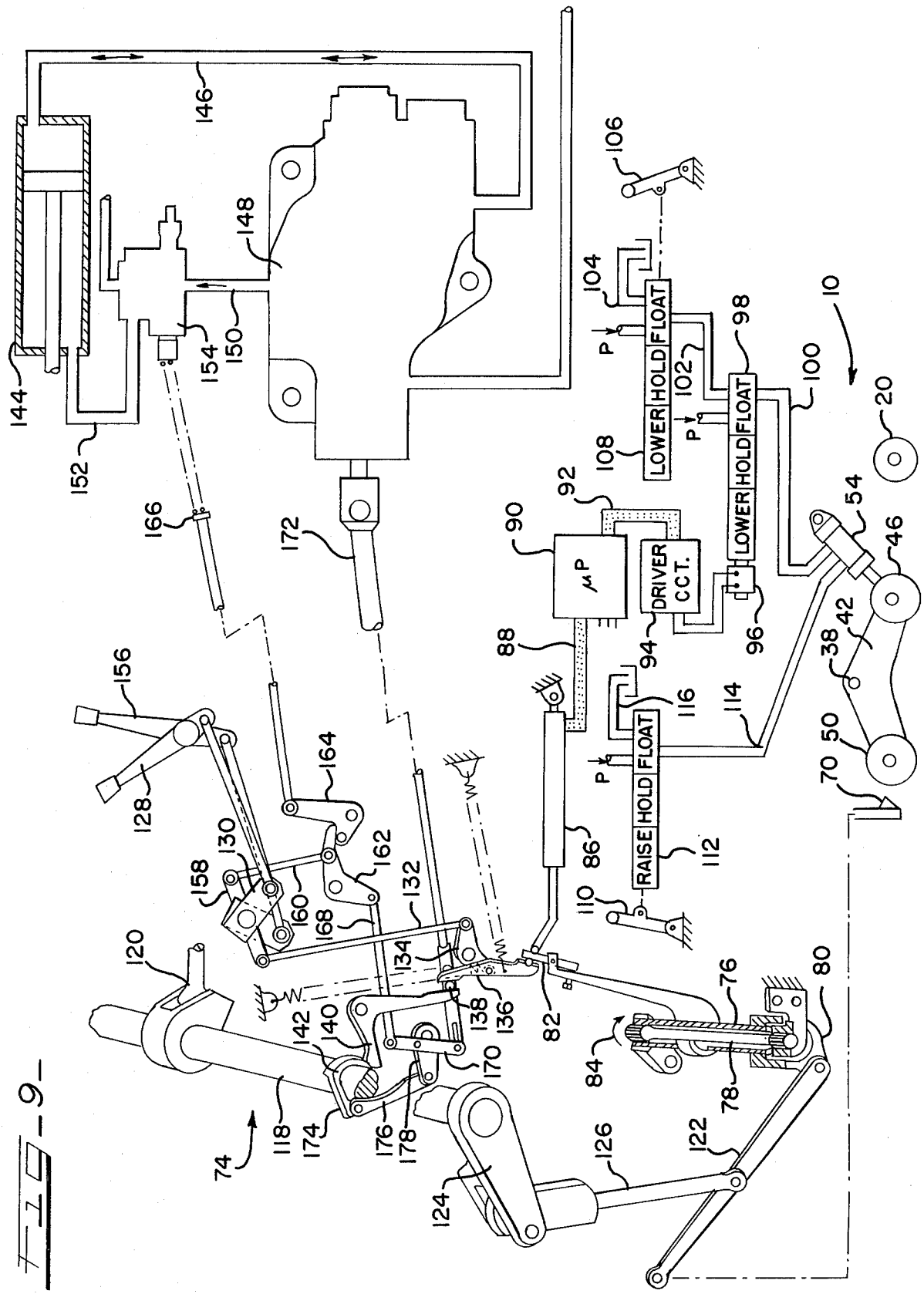

TRACTOR BOGIE SUSPENSION WITH STEERING AND WEIGHT TRANSFER CONTROL

This application relates to a tractor bogie suspension with steering and weight transfer control, effective to pitch such a front-steered machine as to convert from a non-all-wheel drive, three axle operation to an all-wheel-drive, two axle operation, doing so both automatically and on the go.

The reasons, many of which are applicable here, for raising at times different sets of multiple wheels on a vehicle to their semiactive or inactive wheel positions off the ground vary widely as explained in assorted patents including but not limited to U.S. Pat. Nos. 3,502,165; 3,659,671; 3,703,216 and especially 2,936,039; and also particularly in the Valmet retractable bogie-wheeled tractor publications appearing in Design News, Jan. 12, 1976, page 33, Agricultural Machinery Journal, April 1976, page 41, Implement and Tractor, June 7, 1976, Popular Science, March 1977, page 83 and Power Farming, January 1978, page 47 wherein Valmet with their six wheel tractor having four wheel bogie drive solve the wheel slip problem by the option offered of also driving the front steered wheels in an all wheel drive version of their tractor.

According to farm practice in the past, the working tractor in the field operates where possible with maximum pulling power and hence the traction wheels tend to slip on the ground sometimes excessively and, at those times, they lose their effective ground speed. It is therefore the practice to add on poundage such as front tractor weights, rear tractor weights, and to ballast the pneumatic tires or otherwise ballast the tractor particularly adjacent the traction tires. Heading back to the barn for more weight is a problem and thereafter adds another problem because the tractor with its augmented weight undesirably tends to compact the ground.

An object of the present invention, in a tractor equipped with four bogie driving wheels at the rear and two front mounted steered wheels, is in one case to provide better weight distribution on all wheels including the driving wheels when there is minimum slippage, and in the other case to provide automatic or manual transfer of front vehicle weight to the driving wheels during slippage so as to increase the traction with no net weight gain to the tractor. In the one case the dirigible wheels provided up front do the steering and, in the other case where it so happens the front end is pitched up, steering is done exclusively by bogie-wheel-brake skid steering which is provided for by the familiar tractor steering brake pedals.

Various features, objects and advantages will either be specifically pointed out or become apparent when for a better understanding of my invention, reference is made to the accompanying drawings taken in conjunction with the following description which shows certain preferred embodiments thereof and in which:

FIG. 4 is an isometric view of a differential housing of the tractor;

FIG. 5 is an exploded isometric view of a bogie beam sprocket drive;

FIG. 9 is a schematic diagram of the mechanical electrical hydraulic suspension controls.

Figure 1:
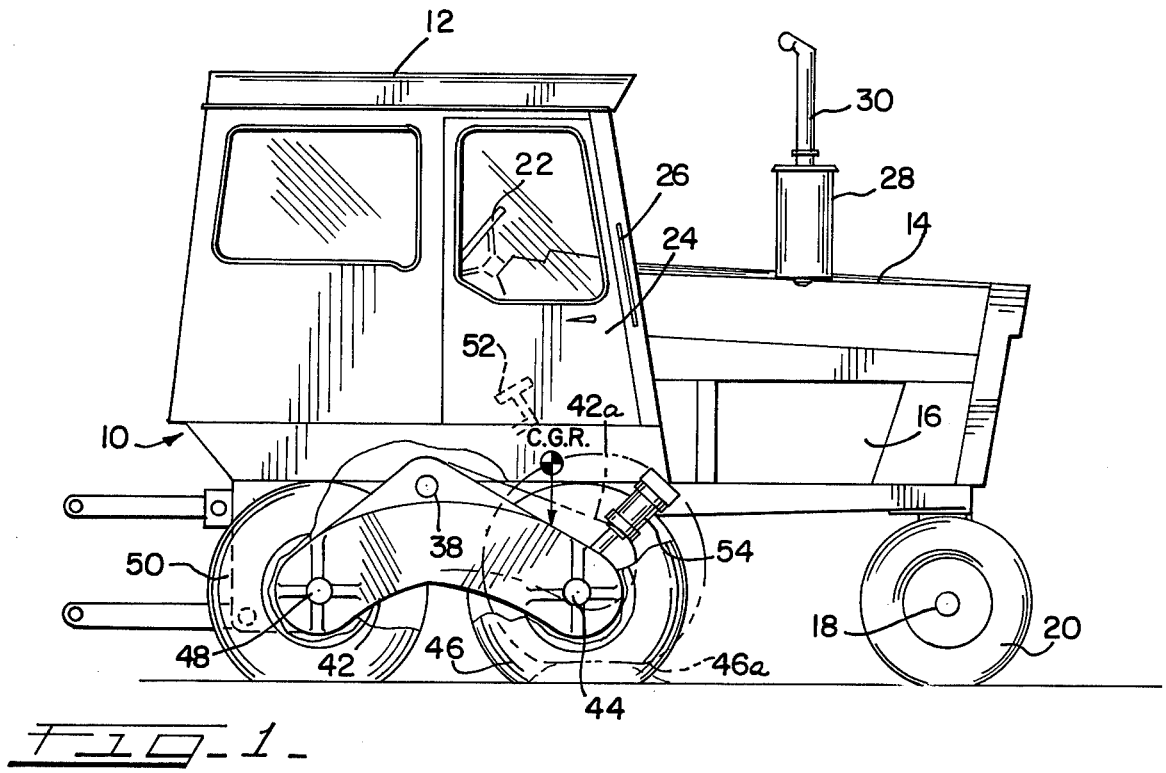
FIGS. 1, 2 and 3 are respective right side elevation, rear side elevation, and bottom plan views of a three axle, four wheel drive agricultural tractor embodying my invention.
Figure 3:
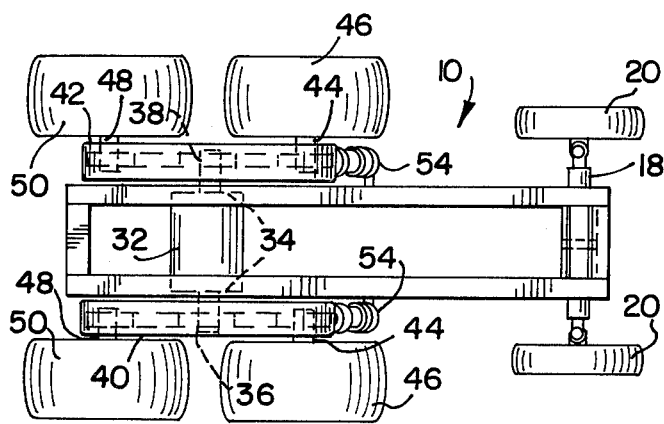
Figure 2:
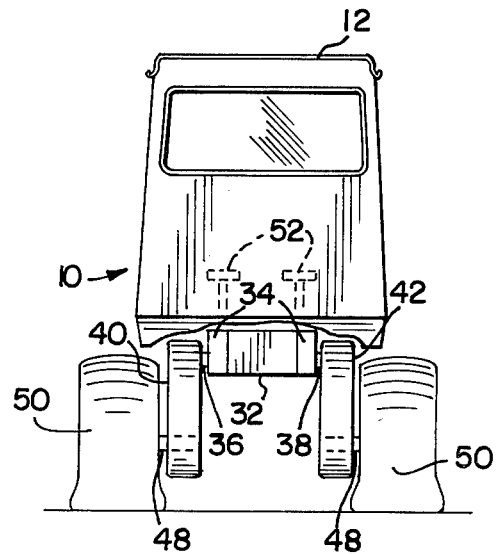

More particularly in the drawings, a farm tractor 10 is shown in FIGS. 1, 2, and 3 having a cab 12 and a hood 14 defining the compartment containing a front mounted engine 16. In the suspension, a dead axle 18 on each side up front carries one of a pair of row crop wheels 20 which are operator steered by linkage from a steering wheel 22.

The cab includes a handle operated side door 24 and a grab rail 26 thereforward. A muffler 28 and vertical exhaust pipe 30 extend upwardly through the hood 14 from the engine 16.

The engine 16 through a transmission, not shown, drives a differential 32 providing, at the rear of the tractor, a pair of drop axle, differential housings 34. Pairs 36 and 38 of transversely aligned pivot and differential shafts are supported by the differential housings and support respective bogie beams 40 and 42 for rocking movement in a longitudinal vertical plane one at each side of the rear of the tractor.

Two front drive axles 44 carried by the bogie beams support a transversely aligned pair of oppositely disposed leading wheels 46. Two similar drive axles 48 carried by the bogie beams at the rear support a pair of trailing wheels 50 which are transversely aligned with one another and, for tracking purposes, are longitudinally aligned at each side of the tractor with the leading wheel 46 at that side.

The four driving wheels 46 and 50 are controlled by brakes, not shown, operated by left and right steering brake pedals 52 in the cab 12.

The bogie beams 40, 42 oscillate independently of one another, allowing for example the right leading wheel 46 to freely take a position 46a when the beam rocks out of the horizontal into the broken line position 42a to accommodate a bump.

On the other hand, the angularity of the individual bogie beams 40 and 42 can be controlled by double acting hydraulic jacks or rams 54 pivoted at the upper end to the tractor underframe and at the lower end to the front arm of the respective bogie beams.

If will be apparent should beam 42 be rocked in the opposite direction from its solid line position by ram 54, and similarly the opposite beam 40 be so rocked by its extending ram 54, the down-forcing of the leading wheels 46 will pitch the tractor and take the weight off the front steered wheels 20; in one existing farm tractor to which a specific design of my invention was tailored, the pairs of pivot and differential shafts 36, 38 were so located that the tractor had a static center of gravity CGR falling a noticable amount to the rear of the bogie front axle 44 for each leading wheel 46.

So the tractor 10 whether under draft load or not will be inherently stable with all four drive wheels upon ground and with the upwardly retracted steered front wheels 20 offering little or no rolling resistance to loose soil or whatever ground condition is being encountered. When so pitched slightly to the rear in this manner, the tractor's steering is accomplished primarily if not entirely by the steering brakes in conventional fashion.

On the other hand when the beams 40 and 42 are pivotally free to float, the weight distribution among the four traction wheels 46 and 50 is altogether equalized and any minor steering adjustments as along row crops can usually be accommodated entirely by the steering wheel 22 and grounded front steered wheels 20.

In FIG. 4, each differential housing 34 at the side presents normal thereto a thickened overhanging shaft carrier 56 for the pair of pivot and differential shafts at that side, indicated schematically at 38 by their common axis.

In the exploded view of FIG. 5, the pivot and differential shafts are again schematically indicated at 38 by their common axis where they serve as trunnions for the bogie beams, of which the right beam 42 is typical as shown. That axis is actually the fixed horizontal rocking axis of the beam.

Sidewise protruding, reenforced bearing bosses 58 normal to the beam receive the respective front and rear axles 44 and 48 for up and down oscillating movement thereof by the bogie beam 42. Final drive gears 60 splined to external splines on the inner ends of the axles 44 and 48 turn with the axles which are journalled in bearings in the bogie beam 42. Pinions 62 which are likewise journalled mesh with the final drive gears 60 and each carries a splined-on chain sprocket 64. The pivot and differential shafts schematically indicated at 38 drive sprockets 66 carried thereby and dual chains 68 are trained between and over the sprockets 64 and 66 to complete a positive chain drive from the drop axle, differential shafts to the bogie wheels, not shown.

Standard wheel equipment, also not shown, consists of a brake backing plate, brake shoes, and a brake drum for each bogie axle, each front and rear bogie axle 44 and 48 at one side of the tractor being controllable in this standard way by an appropriate one of the right and left steering brake pedals 52, FIG. 2.

INCREASED TRACTION—FIG. 6

Figure 6:
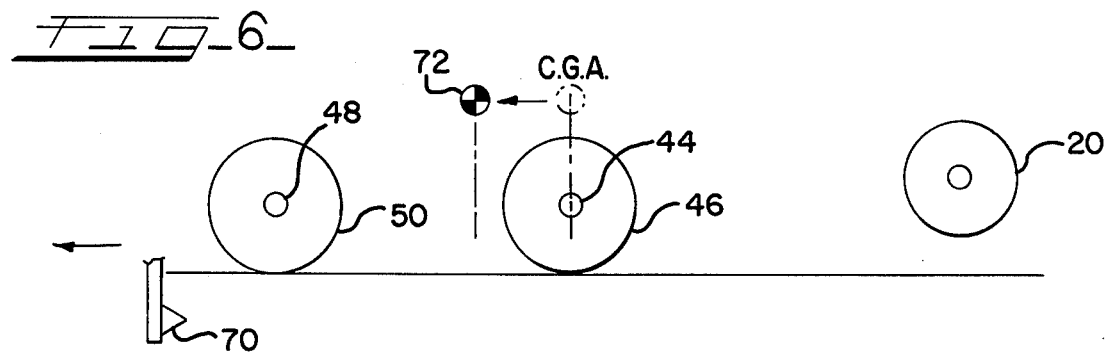
FIGS. 6, 7 and 8 are schematic side elevational views of the three wheels, differently positioned, on the right side of the tractor corresponding to FIG. 1.

Entirely apart from their beneficial function to a tractor 10 with its center of gravity CGR located as illustrated in the embodiment of FIG. 1, the weight transfer rams 54 provided therein can operate to equal advantage in any similar bogie equipped tractor having its static center of gravity CGF located a somewhat noticeable amount to the front of, or its static center of gravity CGA located directly above, the front bogie axle 44 for the leading wheel 46 as actually schematically illustrated in FIG. 6. The reason is that a sustained draft load as from a hitch mounted plow 70 in the ground inherently transfers the latter mentioned CGA to an effective or dynamic or virtual center of gravity 72; that dynamic center of gravity 72 is calculated so as to fall at a point always behind the front bogie axle 44 irrespective of whether the static center of gravity of the vehicle is above the latter axle or slightly forwardly of it.

So the tractor schematically illustrated in FIG. 6 remains inherently stable on all four traction wheels when plowing, with at least a majority of the tractor front weight transferred thereto and with reduced or no ground contact pressure by the steerable dead axle front wheels 20. The utility of having higher traction wheel ground pressure under the condition of higher draft loadings from plow 70 to prevent wheel slippage is to be appreciated. Further to be appreciated is that such utility can actually be realized by constantly monitoring the plow for higher draft loadings and concentrating a majority of the available tractor weight on the traction wheels when pulling under all higher loadings.

TURNING PHASE—FIG. 7

Figure 7:
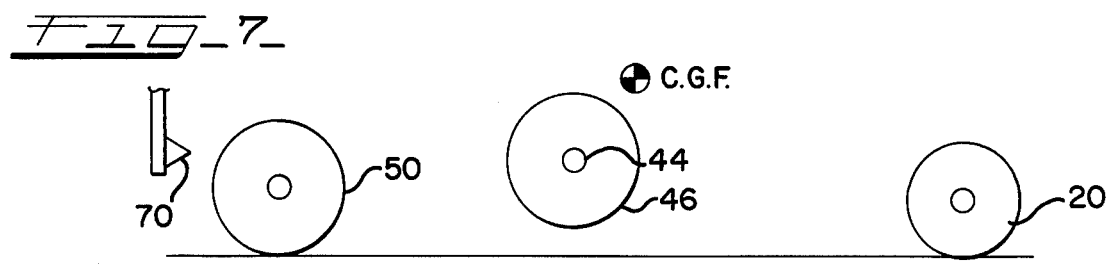

A tractor static center of gravity CGF just mentioned is illustrated in this figure falling a slight but noticeable distance ahead of the bogie front axle 44; that location is equally effective to the purposes of FIGS. 1 and 6, as will be seen from FIG. 7 now to be discussed.

The plow 70 according to this figure is raised at the end of a row and weight transfer rams, not shown, operate the bogies to retract the leading wheels 46 and reposition the steered dead axle wheels 20 firmly on the ground. Turns to the next row are therefore not only readily made by the steering wheel, not shown, but also more easily made without having both sets of wheels 46 and 50 tracking one another and being simultaneously on the ground.

Upon turn execution and realignment of the tractor with the next row, it is a simple matter to transform from the relative positions of the parts as illustrated in FIG. 7. I do so by returning the plow 70 into the ground and reestablishing the higher draft load, and then by reversing the weight transfer rams, not shown, attended by the simultaneous shift of the static center of gravity rearwardly to its effective or dynamic running position behind the bogie front axle 44. So the steerable dead axle wheels 20 are retracted to reduce ground contact pressure at the front and steering by the steering brakes is resumed by the operator.

ANOTHER TURNING PHASE—FIG. 8

As an alternative to the preferred embodiment described in connection with FIG. 1, the tractor static center of gravity CGF can be slightly but noticeably forward of the bogie front axle 44 as illustrated in this figure or else substantially forward thereof if desired. A benefit, though slight, to be realized is that with the plow 70 raised and with the rear bogie axle 48 raised so as to retract the trailing bogie wheels 50, a very short turning radius for the tractor results because of the closeness of the leading traction wheels 46 and the steerable dead axle wheels 20. A contrast in the effective wheel base is apparent by mere inspection as between FIG. 7 in which the leading wheels are illustrated as retracted and in FIG. 8 in which the just noted trailing wheels 50 are illustrated as retracted.

Monitoring means for a draft signal, and traction weight concentrating means automatically responding thereto, can be provided once the utility which I have recognized is pointed out and the need for satisfying that utility is appreciated as I have pointed out.

MICROCHIP COMPUTER SUSPENSION SYSTEM—FIG. 9

Illustrative of one such means for monitoring and concentrating is the system schematically as shown in this figure.

Specifically, a conventional tractor draft control hitch 74, as represented by principal elements all but its left side elements and a few more, is shown on the tractor supporting its plow 70 which is to be contrued as a schematic substitution equivalent to representing a conventional two-way mounted plow, or else a mounted moldboard plow or semi mounted or trailing plow.

A rotary oscillating tube 76 which winds up a load-deflected torsion bar 78 therewithin carries a first load arm 80 and a second load-indicator arm 82. Rotary deflection of the bar 78 by the first arm 80 under the so-called positive loading which is in the direction of the arrow 84 allows the tube 76 and second arm 82 to be similarly displaced. The arm 82 is connected to appropriately adjust a transducer 86 which in its simplest form can be electrical consisting merely of a linear potentiometer. The transducer output, electrically fed through a cable 88 and its necessary intervening conditioning circuits therein, not shown, is applied as input to a microprocessor chip 90 programmed to respond in controlling the force depression of the leading wheels 46 on the vehicle bogie beams 42.

As illustrative of one way of employing the microchip computer 90, it is programmed to constantly monitor the draft signal from cable 88, to take unending repetitive timed averages of the magnitude of the signal, to compare each timed average to a programmed-in reference value, and then to cause the bogie wheels 46 to be depressed and unload the steered wheels 20 for as long as the reference value is exceeded denoting the need for maximum traction.

So the programmed chip output through a cable 92 as required is applied to a driver circuit 94 to control the weight transfer rams of which one is shown at 54. Such control is by means of a driver-circuit-operated solenoid 96 automatically controlling a three position hydraulic valve 98. Valve 98 controls the flow delivered by a PFC pump P so as, in the valve lower position, to pressurize the ram 54 into its fully extended position for weight transfer (FIG. 6). Then in a brief self-timed interval the microchip 90 repositions the valve 98 to the valve hold position where it maintains the rams fully extended for as long as weight transfer is required.

When the timed average draft signal reduces below the reference value, the microchip 90 is programmed to place to valve 98 in its home or float position whereby the formerly pressurized fluid readily flows both ways in conduits 100, 102 and 104 to and from a fluid reservoir tank from which the pump P draws its fluid. So the bogie beams resume freely pivoting.

The driver operates the handle 106 to manually lower and hold the rams 54 through a three position valve 108 interposed in the conduits 102 and 104. Normally, the handle 106 retains the valve 108 in its float position in no way interfering with the automatic effect of valve 98.

Provided for completeness is a second handle 110 by which the operator raises and then holds the leading wheels 46 off the ground (FIG. 7). Normally, the handle 110 holds a three position valve 112 in its float position so as to allow free ingress and egress of rod end fluid from the rams 54 in the conduits 114 and 116 of valve 112 leading to drain. It is evident in this simplistic showing of FIG. 9 that only one of the valves 98, 108, 112 at a time removes from its home or float position whereas the other two must stay in their float positions.

Figure 8:
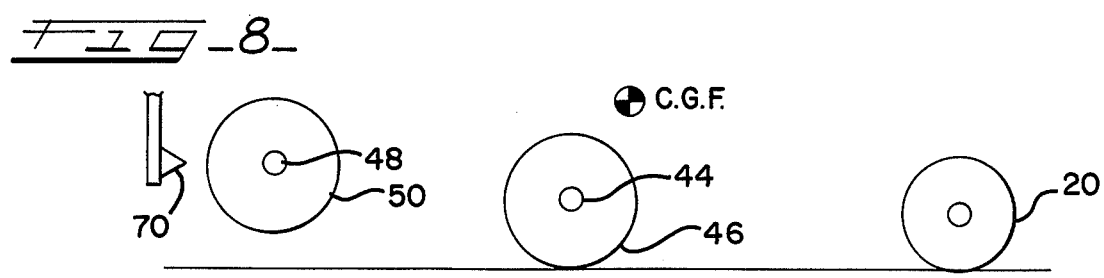
Figure 10:
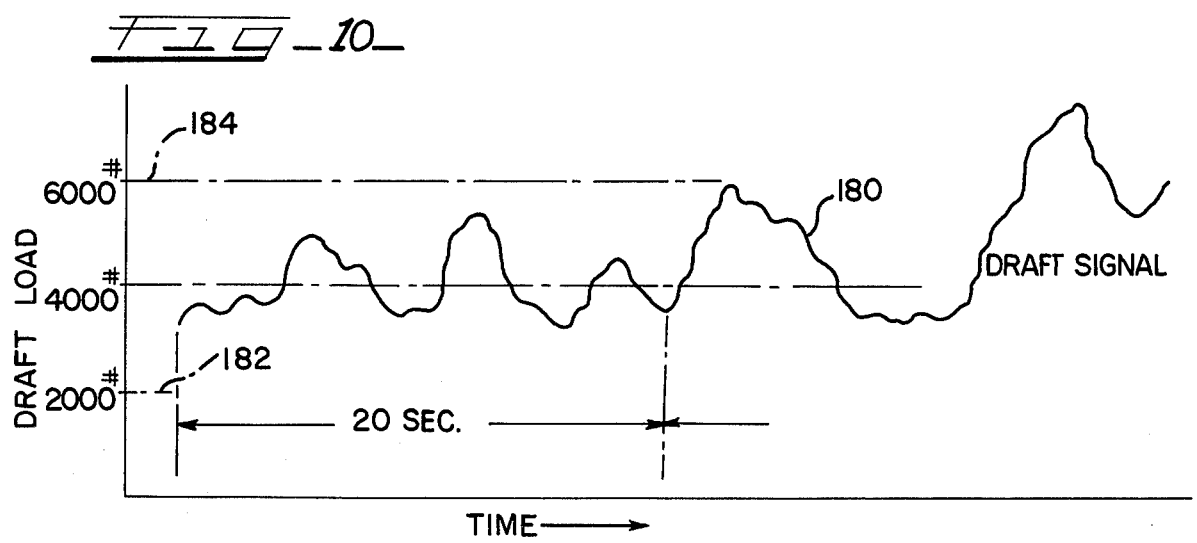
FIG. 10 is a simulated graph of the draft signal represented as draft load plotted against time as the abscissae.

While schematically shown separately for simplicity, the manual valves 108 and 112 in practice will be consolidated as one manual four position valve common in the art as detailed in U.S. Pat. No. 2,936,039 in the description of FIGS. 5, 6, 7, and 8 of the patent drawings. Thus, the positioning illustrated in the alternative embodiment as shown in FIG. 8 hereof will be manually accomplished along with the other manual positioning all with one valve handle.

The conventional hitch 74 illustrated happens to be specifically adapted for a standard PFC pump P operating under automatic pressure flow control. The object in the hitch is to hydraulically operate a power rockshaft 118 through a crank mechanism 120 so as, at each side of the vehicle, to lift and drop a plow-connected lower or draft link 122 which is link interconnected with the rockshaft 118 by means of a rockshaft arm 124 and a lift link 126 connected between the latter arm and the draft link 122.

Settings for the foregoing are adjustably made in part by a draft control handle 128 which is connected by a two-armed crank 130 to a generally vertically disposed draft control link 132. The link 132 transmits motion through a bell crank 134 and a single tree 136 having a connection in one direction to the load indicator arm 82. The single tree 136 has a connection in another direction to the power shaft 118 by way of a common pin 138, a draft control switch-off-lever with cam follower 140, and a cam 142 on the shaft 18 engaged by the lever cam follower.

The power rockshaft crank mechanism 120 is operated through a mechanical connection, not shown, made to the rod of a draft control cylinder 144, itself hydraulically connected directly in one path 146 to a draft control valve 148 and also indirectly thereto in a path 150, 152 by way of an intervening drop control valve 154.

As customarily provided, a position control handle 156 is connected by a two-armed crank 158 and a position control link 160 to a position control link bell crank 162. It is by means of the bell crank 162 that the handle 156 operates to adjust the drop control valve 154 in a first mechanical path including a bell crank 164 and a spring loaded valve link 166. It is also through the bell crank 162 that the handle 156 adjusts the draft control valve 148 in a second path including a link 168, a single tree 170, and a valve connected linkage 172 which provides for lost motion and carries the common pin 138. A mechanical feed-back connection includes a shaft crank 174, a link 176, and a pivoted arm 178 connected to the single tree 170 for proper followup action in any repositioning of the position control handle 156.

The draft control hitch operates within known limits, in respect of all it is capable of, as dictated by draft loading. On the other hand the weight transfer suspension system illustrated in FIG. 9 comes into play under the extreme condition of draft loading such as would otherwise make the traction wheels slip and require the driver to return to the barn for more weights or other ballast to improve the wheel load and draft efficiency.

It has been determined through close observation that the draft signal varies quite a bit during plowing, for example, whether or not with gang plow bottoms or whether in the instance of plowing with a single plow bottom. Therefore within the skill of the art the present microchip computer hereof will, in known way in cooperation with its interval timers, be programmed to continually monitor the draft signal but in uniform consecutive time intervals as will now be explained. In other words, requiring sustained averages will avoid hunting in the controls or instability.

DRAFT SIGNALS—FIG. 10

The simulated fluctuating draft signal 180 graphed in this figure can be seen, for one 20-second interval, to just about average out as corresponding to a 4,000 pound draft load in this illustrative example. A signal of lesser magnitude could average out perhaps to a 2,000 pound load as indicated by the average line 182.

By way of example assume that the microchip 90, not shown, is programmed with a reference value equivalent to a 6,000 pound average draft level as indicated at 184 and that the average draft signal keeps increasing in the rightward direction as illustrated until it starts to average 6,000 pounds or in excess thereof. As long as those high levels are sustained in consecutive 20-second intervals, the microchip will continue to compute, by comparison, that weight transfer is required to be maintained in the tractor and the microchip will therefore insure continued retraction of the dead axle steerable wheels, not shown.

Reduction of the draft load as sensed under the microchip program will cause the suspension to reduce the ground pressure under wheels 46 and 50 and to restore the steerable wheels 20 from the air down to firm ground contact for steering.

If the tractor is modified in the front suspension to include a front wheel truck dirigibly supporting the steered front wheels and supported by hydraulic jacks carried on the underside of the tractor front end, the front wheels can be automatically and manually retracted by those jacks in the practice of my invention. With that modification provided, the present rams 54 can be retrained or eliminated as desired. However, that modification attaches a heavy weight penalty to, and undesirably on, the front suspension so that the preferred embodiment will be equipped solely with the rams 54 to automatically retract the steered wheels cantileverly from the ground.

Compared to conventional suspensions on two wheel drive tractors modified with driving axles provided for the steerable front wheels to accomplish all wheel drive, the present microchip programmed automatic suspension, in the weight transfer posture illustrated herein in FIG. 6, produces the equivalent of a four wheel traction drive by the optionally-pitched, all wheel drive of an actual four wheel drive suspension. In lieu of the conventional large rear drive wheels, my suspension substitutes four traction small wheels materially reducing unit ground pressure and increasing the ground foot print area for increased traction. The driver visibility is greatly improved with the smaller rear mounted bogie tires, and the leading ones thereof tend to compact the ground just ahead of the immediately tracking trailing tires which are thus afforded a solid and therefore better ground grip. The normal rolling resistance of the conventional two wheel drive tractor due to its steered front wheels is materially reduced if not substantially eliminated in the pitched condition of the present automatic weight transfer suspension.

Dynamic forces, with the tractor at a corresponding pitch angle to its suspension as shown in FIG. 6, arising during plow pull are better handled by my two tandem action wheels at each side because, with the rams fully extended, the trailing driving wheel on each side is located rearwardly of the normal two wheel drive tractor axle and, inherently from that rearward location, more effectively opposes rearward tipping.

Again with the rams fully extended in the alternative embodiment illustrated in FIG. 8, the ground weight distribution is changed the opposite way, the tractor being pitched slightly forwardly with the rear slightly raised and affording a materially shortened wheel base for the sharp turns sought.

Or, with the rams fully retracted for attaining the result illustrated in FIG. 7, the ground weight redistribution allows safe high speed highway riding with a full wheel base substantially longer than the normal two wheel drive tractor wheel base. Here again, similarly to the steered wheel retraction effective according to FIG. 6, the rolling resistance and friction of the leading wheels 46 in FIG. 7 is materially reduced if not substantially eliminated during highway travel.

Finally, no appreciable flexibility or performance is sacrificed due to the foregoing automatically forced operation of the rams provided herein, because of the wide dead band or dead zone in the automatic operation before the tractor is changed from its full three-axle posture of FIG. 1. It is sometimes possible to plow an entire field without appreciable slippage or tire wear so that the natural weight distribution obtains with the full six wheel ground contact illustrated in FIGS. 1 and 2. The double acting rams will simply remain on float and the independently acting beams will maintain precise equal distribution of ground contact pressure among the four traction wheels. For uniformity as to spares, all tires and wheels, although not illustrated that way in FIG. 1, can be of identical size.

Variations within the spirit and scope of the invention described are equally comprehended by the foregoing description.

What is claimed is:

1. A front steered draft vehicle comprising an agricultural tractor including a load-deflected plow hitch, said tractor having rear bogie beams (40,42) each mid-mounted and including live-axle-connected leading and trailing bogie drive wheels (46,50);

weight re-distribution means to increase drive wheel traction including weight transfer rams (54) one for rocking each bogie beam to pivot the leading drive wheels (46) downwardly forcing the beams to assume at least a majority of the thus cantilevered front end weight of the tractor;

the mid-mounting of the bogie beams including transversely aligned beam pivots (36,38) so located on the tractor that the effective center of gravity (72) of the latter will fall behind the live axles of the leading bogie drive wheels (46) at least always when the vehicle is under draft loading;

means of operating the weight transfer rams comprising selective arm-operated (90) and manual (106,110) means;

said load-deflected hitch including drawbar draft links (122) and a load arm (80) connected thereto to deflect the hitch in sensitivity to the drawbar draft load; and a load indicating arm (82) mechanically connected to the hitch and displaced thereby in accordance with sensitivity to the deflecting load;

said arm-operated means (90) of operating the weight transfer rams connected to the load indicating arm and effective in response to a predetermined load sensed in the draft links (122) to operate the rams forcing the leading bogie drive wheels downwardly as described.

2. The invention as set forth in claim 1, said arm-operated means of operating the weight transfer rams comprising means (86,90,92,94) electrically sensitive to the displacement of the load indicating arm to generate an electrical signal corresponding to the deflecting load; and hydraulic means (96,98) connected to the electrically sensitive means effective to hydraulically operate the rams in accordance with the electrical signal being generated.

3. The invention as set forth in claim 1, said last named means comprising a load indicating arm (82) mechanically connected to the hitch (74);

a multiposition valve (98) hydraulically connected between a source of pumped fluid (P) and the rams (54); and a transducer (86), a microchip computer (90), a driver circuit (94), and a solenoid (96) electrically connected to one another and interconnecting the arm (82) and multiposition valve (98).

4. A multiple wheel, steered draft vehicle suspension control system providing for weight redistribution for improved traction under increasing draft hitch loads without ballast addition to the vehicle (10), comprising:

a load deflected hitch including draft links (122) and a drawbar load arm (80) connected thereto to deflect the hitch in sensitivity to the drawbar load;

a load indicating arm (82) mechanically connected to the hitch and displaced thereby in accordance with sensitivity to the deflecting load;

means (86,88,94) electrically sensitive to the displacement of the load indicating arm providing a draft signal corresponding to the deflecting load;

a weight transfer ram (54) connected in the suspension to shift ground contact and hence weight distribution by means of wheel (20) retraction; and ram controlling hydraulic means (94,96) responsive to the draft signal for automatically operating the weight transfer ram.

5. The invention as set forth in claim 4, said last named means comprising a transducer (86) mechanically connected to the draft signal means (82);

a solenoid valve (96, 98) hydraulically connected for supplying pressure fluid to the ram (54); and means electrically connecting the transducer (86) and solenoid valve (96) including a microchip computer (90) and a solenoid driver circuit (94).

6. Multi-wheel steered draft vehicle suspension control which, because of draft load variance, controls ground contact pressure of sets of live-axle and dead-axle wheels on the vehicle and which does so by retracting dead-axle wheels (20) for concentrating the supported vehicle weight transferred upon, and tractive effort of, the live-axle wheels (46,50) still in firm ground contact, comprising:

a load-deflected hitch including drawbar draft links (122) and a load arm (80) connected thereto to deflect the hitch in sensitivity to the drawbar load;

a load indicating arm (82) mechanically connected to the hitch and displaced thereby in accordance with sensitivity to the deflecting load;

means (86,90,92,94) electrically sensitive to the displacement of the load indicating arm for generating a draft signal (180) corresponding to the deflecting load;

means (90) for sensing when the signal (180) sustains a predetermined level corresponding to a given magnitude reached by the deflecting load; and retractable wheel means (96,98,54) for automatically applying power to retract a set of dead-axle wheels (20) in response to the sensing of said predetermined signal level.

7. The invention as set forth in claim 6, said last named means comprising bogie means (40, 42) supported by the sets of live-axle wheels (46, 50) and effective pivotally (36, 38) to cantileverly support the vehicle by assuming the majority of the dead-axle wheel load, and extensible rams (54) connected between the vehicle and bogie means (40, 42) to pivot the vehicle thereon, said generating means (86) and sensing means (90) comprising a draft load transducer and a microchip computer (90) to cause extension of said rams (54).

8. Mode of converting the operation of a normal three-axle multi-wheel steered draft vehicle suspension control which because of draft load variance controls ground contact pressure of two sets of live-axle and one set of retractable dead-axle wheels on the vehicle and which does so by power applying means to retract the axle concerned and the retractable set of its dead-axle wheels for concentrating the supported vehicle weight transferred upon, and the tractive effort of, the two axles of the live-axle wheels which are still in firm ground contact, comprising:

constantly monitoring (86,90) the draft load; and applying power (54) automatically to retract the axle concerned and its set of dead-axle wheels so as to convert to an all-wheel-drive, two-axle operation when the monitored draft reaches a predetermined draft load.

9. Mode of converting the operation of a three-axle multi-wheel steered draft vehicle suspension control which because of draft load variance controls ground contact pressure of two sets of live axles and one set of retractable dead-axle wheels on the vehicle and which does so by power applying means to retract the axle concerned and the retractable set of its dead-axle wheels for concentrating the supported vehicle weight transferred upon, and the tractive effort of, the two axles of the live-axle wheels which are still in firm ground contact, comprising the steps of:

generating a draft signal (180);

sensing (86,90) when the signal sustains a predetermined level corresponding to a given magnitude of draft loading; and applying power (56) to automatically retract the axle concerned and its set of dead-axle wheels (20) so as to convert to an all-wheel drive, two-axle operation in response to the sensing of said predetermined level of signal.

10. The invention as set forth in claim 9, said signal (180) comprising a timed average signal (184).

* * * * *